UNITED STATES PATENT OFFICE.

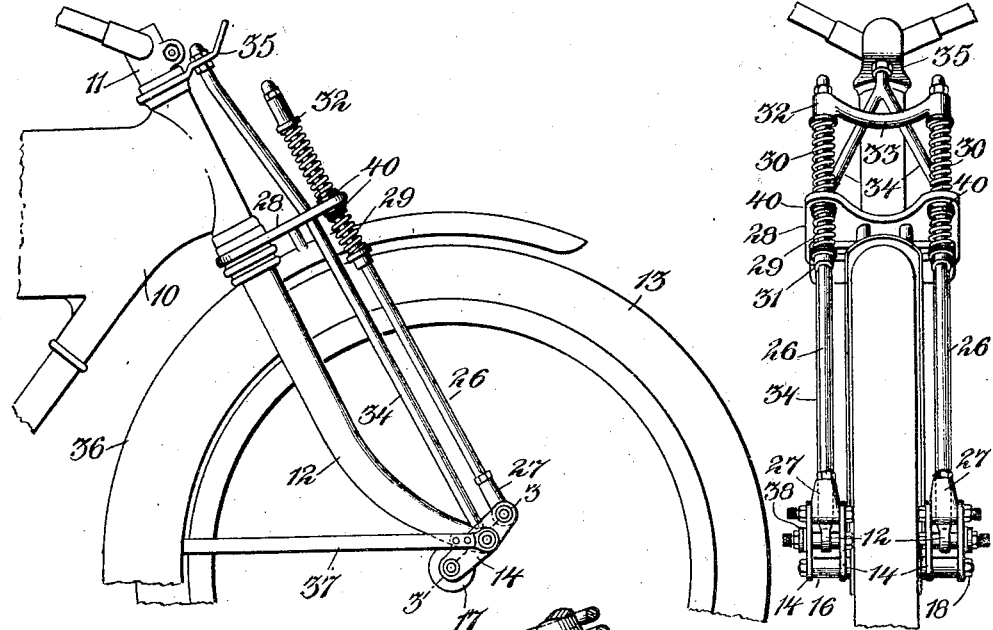
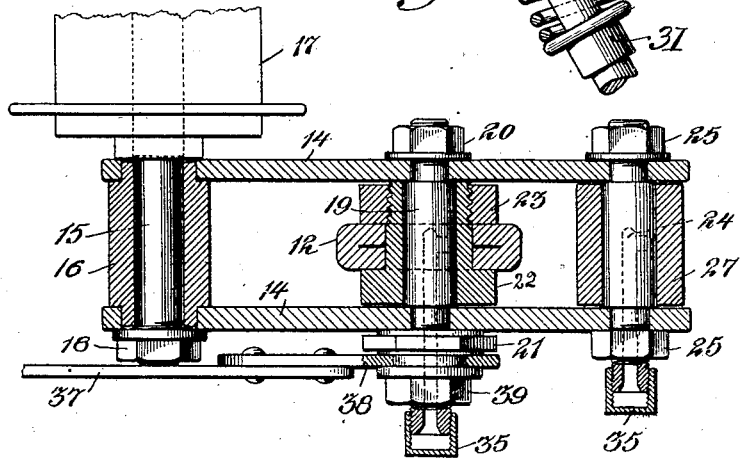

NORBERT H. SCHICKEL, OF STAMFORD, CONNECTICUT.

MOUNTING FOR VEHICLE-WHEELS.

1,189,874.  Specification of Letters Patent.  Patented July 4, 1916.

Application filed December 18, 1912. Serial No. 737,566.

*To all whom it may concern:*

Be it known that I, NORBERT H. SCHICKEL, a citizen of the United States, and resident of the city of Stamford, in the county of Fairfield and State of Connecticut, have invented certain new and useful Improvements in Mountings for Vehicle-Wheels, of which the following is a specification.

My invention relates to and involves certain improvements in the connecting means for securing or mounting vehicle wheels on the vehicle frames and although my invention, in whole or in part, may be utilized in various types of vehicles it is specially adapted for use in bicycles or other velocipedes propelled by the rider or by motor. In vehicles of this type it is customary to mount the front wheel in a steering member including a pair of forks and in the heavier vehicles, such as motor cycles, a resilient connection between the wheel and the frame is commonly employed. One type involves the use of short levers or links on opposite sides of the wheel and each connected to the axle and to the fork and a third point on each lever is resiliently connected to the frame.

My invention relates particularly to this type and certain features are especially useful where these levers are so mounted as to extend forwardly and upwardly with the fork connected to the intermediate portions of the levers, the axle to the rear lower ends and tension rods to the front upper ends, said tension rods being resiliently connected to the frame. By means of this arrangement a much smaller and lighter rod may be employed than is required where the rods are under compression and liable to bow or buckle. Furthermore when the wheel strikes a small obstruction in the road the natural result is a retarding and lifting of the wheel. With the wheel on a lever of the preferred character above referred to the swinging of the lever permits the wheel to rise and be retarded without imparting the shock to the frame of the machine and, furthermore, the strain on the tension rods continually tends to straighten them in case they have been accidentally bent. In connecting these rods to the frame and to the axle and forks, I employ certain important and novel features of construction and arrangements of parts, the operation of which is not dependent in most cases upon the fact that the rods are under tension instead of compression. The connection between the rods and the frame preferably includes two springs both under compression with the coacting frame part floating between so that the movements in both directions are resiliently controlled and retarded equally and an excessive upward or downward movement is gradually rather than abruptly stopped. In connection with the springs I may employ a special arrangement whereby the relative movements of the parts produce a shock absorber action increasing with increased movements from the normal. This may be produced by the twisting of the rods in the frame part as they reciprocate therethrough. This frame part is preferably braced against upward or downward movement in respect to the forks and the forks may be of skeleton formation with an intermediate transverse brace which may serve also as the guide and support for the rods.

The levers at the axles in the preferable construction involve certain important features of my invention, among which is the forming of each lever of two parallel spaced plates between which the corresponding fork and rod are pivotally mounted. This avoids all twisting strain and permits such a construction of the pivots that the loosening or even the loss of two or more of the nuts or other pivot fastenings may occur without danger of the disassembling or derangement of the parts. An extension of the axle preferably serves as a stop for engagement with the forks in case the rods, springs or coacting frame part break and sufficient freedom is left above the wheel so that the wheel may rotate in this position. The machine may thus be ridden without the resilient connection if these parts are broken or removed.

It is evident that various different constructions and arrangements may be designed within the scope of my invention and therefore it is to be understood that the specific form shown in the accompanying drawings should be considered in an illustrative sense rather than in a limiting one. In these drawings similar reference characters indicate corresponding parts in the several views.

Figure 1 is a side elevation of the front portion of a vehicle constructed in accordance with my invention; Fig. 2 is a front elevation of the parts shown in Fig. 1; Fig.

3 is a sectional detail taken on the line 3—3 of Fig. 1 but on a larger scale, and Fig. 4 is a sectional detail of the upper portion of the rod support.

I have illustrated one form of my invention as applied to a vehicle having a main frame 10, a steering head 11, forks 12 and a front wheel 13. The forks are connected to the steering head and the latter is rotatably mounted in any suitable manner common in the art. Pivoted to the forks at their lower ends are two lever members each made up of two leaves or links 14. These lever members each has its rear end pivotally connected to the axle of the wheel and the front end resiliently connected to the frame while the forks engage with the lever members intermediate of the ends of the latter. The lever members extend upwardly and forwardly so that when the wheel engages with an obstruction in the road it may swing rearwardly and upwardly by the tilting of the lever members and without imparting the shock to the frame of the machine. The two leaves or links 14, 14 of each lever member are spaced apart and so constructed that in case the resilient connections are broken or displaced the fork may rest on the wheel axle and the vehicle may be ridden until a repair shop is reached. Furthermore the lever members are so constructed that the pivot pins cannot loosen and two or more of the retaining nuts may be lost before there is any liability of separation or displacement of the parts. The wheel preferably has an axle 15 extending outwardly beyond the end of the hub 17 and the two links are either connected directly to this axle or upon a sleeve 16 on the latter so as to swing about the axis of the axle as a center. Preferably a sleeve is employed which has a central or body portion presenting shoulders spacing the two links apart so that a nut 18 may bind the links and axle firmly together and against a collar adjacent to the end of the hub. The forks are connected to the lever members by a pivot pin 19 disposed intermediate of the end of the lever member and so constructed that it cannot be moved lengthwise through either of the links. One means of accomplishing this is to form the central or body portion of the pin of larger diameter than the openings through the links so that said body portion will present shoulders against which the links may be tightly held by nuts 20 and 21. One connection which may be employed involves the use of a sleeve 22 journaled on the pivot pin and presenting a head and a threaded end. A nut 23 screwed on to the threaded end may bind the lower end of the fork 12 firmly on the sleeve 22. The sleeve is of such length that it cannot move lengthwise between the links or leaves but may rotate as required. At the front ends of the lever members the two links are spaced by a pivot pin 24 similar to the pivot pin 19 and held by suitable nuts 25. Each front pivot pin 24 is resiliently connected to the frame of the machine by a rod 26 terminating at its lower end in a sleeve 27 encircling the corresponding pivot pin 24 between the two links. These rods serve to support the front ends of the lever members and are therefore under tension. Their upper ends are resiliently connected to the frame of the machine so that the lever members may swing as the wheel passes over obstructions or irregularities in the road.

The resilient connection between the tension rod and the frame is preferably such that resistance to the movement of the lever members in either direction is exerted to the desired extent and the resistance is increased as the movement in either direction continues. Furthermore I preferably produce a shock absorber action by bringing into play a frictional resistance which increases upon an upward movement of the body of the vehicle. In the preferred construction the steering member of the frame at the upper end of the forks carries a forwardly extending brace in the form of a plate 28 through which rods 26 slide. The plate is approximately but preferably not at exactly right angles to the tension rods and has openings therethrough serving as guides for the tension rods but permitting an angular movement of said rods as well as a reciprocating movement. On each rod are two springs 29 and 30 one above the guide plate and one below and both under compression. The lower spring is held between the guide plate and a stop 31 on the rod and the upper spring is held between the guide plate and a stop 32. Preferably the two stops 32 are connected together by a link 33 which not only steadies them but insures the application of equal pressure to the two springs 30, 30. In engagement with opposite sides of the guide plate 28 and braced against the same are two friction washers 40, 40 of fiber or any other suitable material. As the lower ends of the rods are connected to levers it is evident that any reciprocating movement of the rods is accompanied by an angular movement and that this angular movement is greater on an upward movement of the frame in respect to the wheel than it is upon a downward movement from the normal. The angular movement of the rod causes the washers to slide slightly upon the surface of the guide plate 28 and the sliding is resisted by the pressing of the washers against said plate by the springs. The farther the angular movement of the rods the greater will be the accompanying spring pressure on the washers and the greater the resistance to the sliding of said washers, and the greater the wedging action of the washers on the rods. These washers thus act as a shock absorber which tends to resist or retard the movement of the parts and prevent the jolting or rapid vibration of the parts under the action of the springs.

The guide plate 28 is braced against upward or downward movement in respect to the frame by brace rods 34 connected to the lower ends of the forks and to the upper end of the steering head. The two rods may be united adjacent to their upper ends as shown in Fig. 2 and may be connected to a plate or bracket 35 just below the handle bars. These brace rods extend through the guide plate adjacent its outer edge and may be welded or otherwise secured thereto. These brace rods may be employed for strengthening or reinforcing forks independently of any action of the resilient connections and thus the guide plate 28 may serve merely as an intermediate brace or support for the brace rods.

It will be noted that the forks 12 lie in vertical planes cutting the extensions on the axle and that in case of excessive movement the forks will engage with the sleeves 16. Thus in case the tension rods 26, the springs, the pivot pins 24 or other coacting parts become broken or are removed for any purpose whatsoever the lever members may swing to such a position that the forks will rest directly against the sleeves 16 on the axle and the vehicle may be ridden in the ordinary manner except that there will be no spring action. With the parts in this position there will be no lost motion as the lower portions of the forks approach a horizontal position so that they may rest directly upon the axle extensions.

Various other features of importance may be embodied in the construction above described. For instance the two pivot pins 19 and 24 may have axial passages therein normally closed by caps 35. These passages may connect with inner radial passages so that lubricating oil may be injected through the pivot pins to the inner surface of the sleeves 22 and 27. The front wheel is preferably provided with a mud guard 36 which may be rigidly secured to the upper ends of the forks. The lower end of the mud guard is preferably provided with braces 37 extending forwardly to points adjacent to the lower end of the forks. Each may here connect with a link 38 mounted to rotate on a cylindrical portion of a lock nut 39 on the pivot pin 19. The link will be held against sidewise movement by the nut 21 and the nut 39 and the two nuts may slightly turn in the link during the swinging of the lever and without interference from the brace 37. It is only necessary to remove the outer nut 39 in removing the brace 37 should such be desired.

As previously stated the form illustrated in the drawing is only one form which my invention may assume and various changes may be made within the scope of the appended claims and without departing from the spirit of my invention.

I claim:

1. A vehicle having a wheel, a frame part and connections between said wheel and said frame part, said connections including a rod, a rigid guide for said rod, and through which the rod may move longitudinally and angularly, springs encircling said rod upon opposite sides of said guide and both normally under compression and friction washers in engagement with said guide, said washers acting as seats for said springs and slidable upon said guide during the angular movement of said rod in said guide and acting to resist said movement.

2. A vehicle having a fork, a vehicle wheel having its axle movable bodily in respect to the lower end of said fork, tension rods connected to said axle, a guide rigid with said fork adjacent its upper end and supporting said tension rods, and two springs under compression on each of said tension rods and in engagement with opposite sides of said guide.

3. A vehicle having a wheel provided with a projecting axle, a link having one end pivoted to said axle, a frame including a part pivoted to said link intermediate of the ends of the latter and extending across above said projecting axle and connections between the opposite end of said link and said frame, said axle extension serving to support said frame part by the latter resting on the former upon the breaking or loosening of said connections.

4. A vehicle having a wheel provided with a projecting axle, a link including two spaced members pivoted thereon, a pivot pin supported by said members, means for preventing the longitudinal movement of said pivot pin through either of said members, a second pivot pin carried by said members, a frame having a part secured to one of said pivot pins between said members, and resilient connections between the other of said pins and said frame.

5. A vehicle having a wheel provided with a projecting axle, a link including two spaced lever members pivoted thereon, two pivot pins carried by said members and each of such diameter intermediate of its ends as to prevent its longitudinal passage through either member, a frame having a part journaled on one of said pins between said members, and resilient connecting means between the other of said pins and said frame.

6. A vehicle having a frame part, a pivot pin extending through the lower end thereof, two lever members carried by the said pivot pin upon opposite sides of said frame part and each having an aperture therethrough of smaller diameter than the body of said pivot pin, a vehicle wheel having connections with one end of said lever members and means for resiliently supporting the opposite end of said lever members.

7. A vehicle having a frame part, a pivot pin extending therethrough, two rigidly connected link members carried by said pivot pin upon opposite sides of said frame part and having apertures therethrough of smaller diameter than the body of said pivot pin, a vehicle wheel mounted on said link members and resilient means normally tending to prevent the swinging of said link members in respect to said frame part.

8. A vehicle having a wheel, two links pivoted thereto one on each side and each including two spaced lever members and a plurality of pivot pins mounted between said members and each of such diameter intermediate of its ends as to prevent its passage through either member, and a frame having two resiliently connected parts mounted on said pivot pins between said lever members.

9. A vehicle having a frame part, the lower portion of which extends in a direction having a horizontal component, a link pivoted intermediate of its ends to the lower end of said frame part, a wheel pivotally mounted at one end of said link, the said link at said end having a portion in the vertical plane of said frame part and beneath the latter and resilient connections between the opposite end of said link and said frame part and normally tending to keep said first mentioned link end and said frame part in spaced relationship.

10. A vehicle having a pair of fork parts, the lower portion of each of which extends forwardly, links pivoted intermediate of their ends to the lower ends of said fork members, a wheel mounted between said links at the rear ends of the latter, said links at their rear ends having portions disposed beneath and normally spaced from the forwardly extending portions of said fork members but movable into engagement with the latter, and tension means connected to the forward ends of said links and normally preventing said engagement.

11. A vehicle having a fork including a pair of fork members, brace rods rigidly connected at their upper and lower ends to said fork members, a guide plate intermediate the ends of said brace rods and rigidly secured to the latter and to said fork, links pivotally connected intermediate of their ends to the lower end of said fork members, a wheel having its axle secured to one end of each of said links, tension rods connected to the opposite ends of said links and extending through said guide plate, and springs encircling said rods upon opposite sides of said guide plate and normally under compression.

12. A vehicle having a fork including a pair of fork members, brace rods rigidly connected at their upper and lower ends to said fork, a guide plate intermediate the ends of said brace rods and rigidly secured to the latter and to said fork, links pivotally connected intermediate of their ends to the lower end of said fork members, a wheel having its axle secured to one end of each of said links, tension rods connected to the opposite ends of said links and extending through said guide plate, springs encircling said rods upon opposite sides of said guide plate and normally under compression, and friction washers acting as seats for said springs and disposed upon opposite sides of said guide plate.

Signed at New York city, in the county of New York and State of New York this 11th day of November, A. D. 1912.

NORBERT H. SCHICKEL.

Witnesses:
 FLORENCE LEVIEN,
 C. W. FAIRBANK.